April 28, 1970     T. ROGERS     3,508,411

DOUBLE VIBRATING PLOW

Filed Jan. 24, 1967     3 Sheets-Sheet 1

INVENTOR:

THELMER A. ROGERS

BY:

April 28, 1970

T. ROGERS 3,508,411

DOUBLE VIBRATING PLOW

Filed Jan. 24, 1967

INVENTOR:
THELMER A. ROGERS
BY:

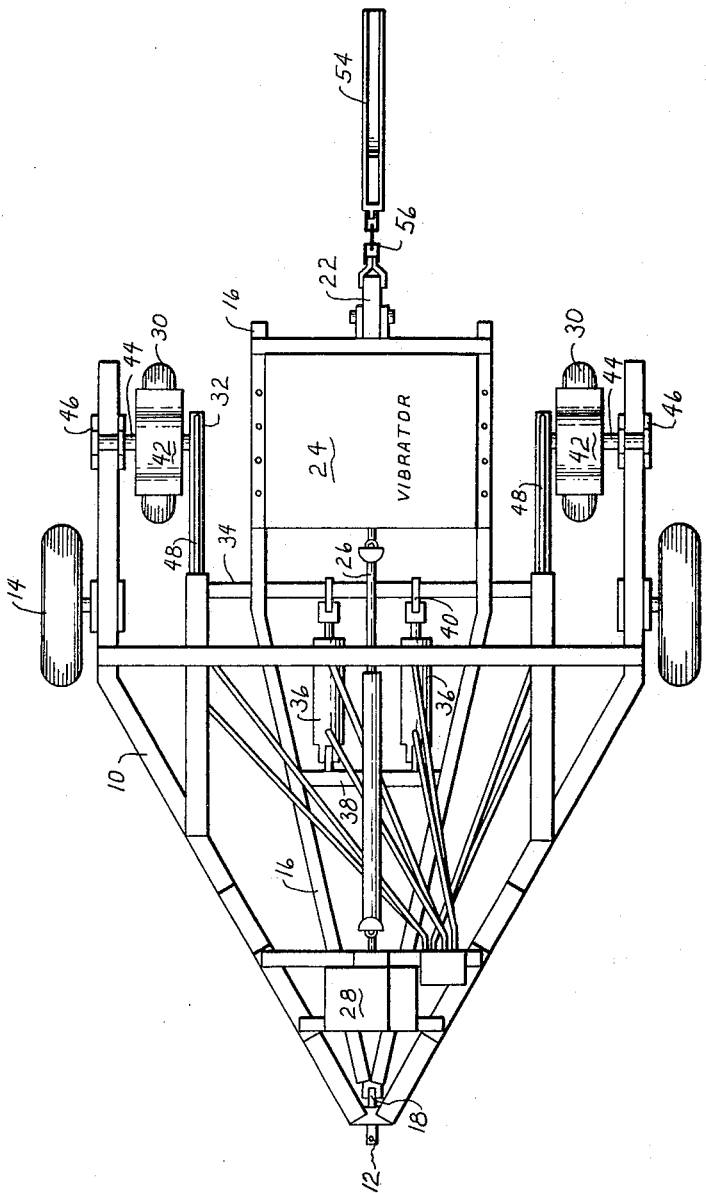

United States Patent Office 3,508,411
Patented Apr. 28, 1970

3,508,411
DOUBLE VIBRATING PLOW
Thelmer A. Rogers, P.O. Box 1589,
Lubbock, Tex. 79408
Filed Jan. 24, 1967, Ser. No. 611,401
Int. Cl. A01b *35/00*
U.S. Cl. 61—72.6    5 Claims

ABSTRACT OF THE DISCLOSURE

A plow on an inside frame with induced vibration is held in the ground by an outside frame. The pneumatic tires of the inside frame act as a double spring system, over the ground and under the outside frame, as shown in the drawing. Raising the plow out of the ground is achieved by moving the pneumatic tires down and by a cable system operated by hydraulic cylinders, as shown in the drawing.

CROSS-REFERENCE TO RELATED APPLICATION

Inventer, Thelmer A. Roger, Ser. No. 445,156, filed Apr. 2, 1965, Patent No. 3,396,804.

BACKGROUND OF THE INVENTION

Field of the invention

This invention relates to earth working and, more particularly, to a plow having a vibratory ripper shank as the earth working tool.

Description of the prior art

Previously it has been known that it is desirable to vibrate a plow for greater penetration. For example, see U.S. Patents to Lamb, 3,103,250, Sept. 10, 1963, and Patton, 3,211,236, Oct. 12, 1965. Also, it has been recognized as desirabe not to vibrate the entire plow-carrying frame as shown by applicant's prior application cross-referenced above.

In non-vibrating cable layers, the desirability of having the cable chute pivoted to the plow has been recognized. Kelley, 3,170,300, Feb. 23, 1965.

SUMMARY

In agriculture, in road buliding, in cable laying, and in laying of underground pipelines, it is desirable to force a plow deeply through the earth. When the plow operates at depths of 24 inches or more, a problem exists in keeping the plow down. If the terrain is hard, often the entire plow with frame will ride out of the ground to a shallower depth. This is particularly true if the plow is operating through soft rock.

Also, when operating at such depths, a problem exists in raising the frame to a height sufficient to get the plow above the surface of the earth when moving from one location to another.

I have previously developed a vibrating plow having an inside vibrating frame and an outside carrier frame. All connection between the inside frame and the outside frame must be particularly designed so as not to dampen the vibrations of the inside frame. However, I have found that placing a roller attached to the outside frame immediately over the pneumatic tire of the inside frame will place the weight of the outside frame upon the inside frame without dampening the vibrations. The pneumatic tire acts as a resilient element in the vibration system and, instead of acting as a single spring between the inside frame and the ground, it acts as two springs—one between the inside frame and the ground and the other between the outside frame and the inside frame.

The pneumatic tires of the inside frame also act as gauge wheels and are mounted on the end of crank arms. The vibrational stresses exert tremendous strain upon the arms. Therefore, it is desirable to keep them as short as possible. On the other hand, if the ripper plow works extremely deep in the soil, it is necessary that here be considerable movement upon the frame to pull the plow free of the ground. I have improved upon the system for moving the plow from the ground by first rotating the crank arms to lift the inside frame as high as possible with the tires bearing against the ground. Thereafter, cables attached to the arms adjacent the tires are drawn in by hydraulic cylinders upon the outside frame to lift the inside frame even higher.

When using the machine to lay cable, some operators do not desire the cable chute to be vibrated. It has been found that the chute may be isolated from the plow by attaching it with a chain.

An object of this invention is to provide a plow which will operate extremely deep in hard terrain.

Another object is to provide for lifting the plow's working point clear of the surface of the ground.

Another object is to isolate the cable chute from vibration of the plow.

Further objects are to achieve the above with a device that is sturdy, compact, durable, simple, safe, versatile, and reliable, yet inexpensive and easy to manufacture, operate, and maintain.

Still further objects are to achieve the above with a method that is rapid and inexpensive and does not require skilled people to adjust, operate, and maintain.

The specific nature of the invention, as well as other objects, uses, and advantages thereof, will clearly appear from the following description and from the accompanying drawing, the different views of which are not necessarily to the same scale.

DESCRIPTION OF THE DRAWING

FIG. 3 is a top plan view of the machine in the FIG. 1 position.

DESCRIPTION OF THE PREFERRED EMBODIMENT

Figure 1:
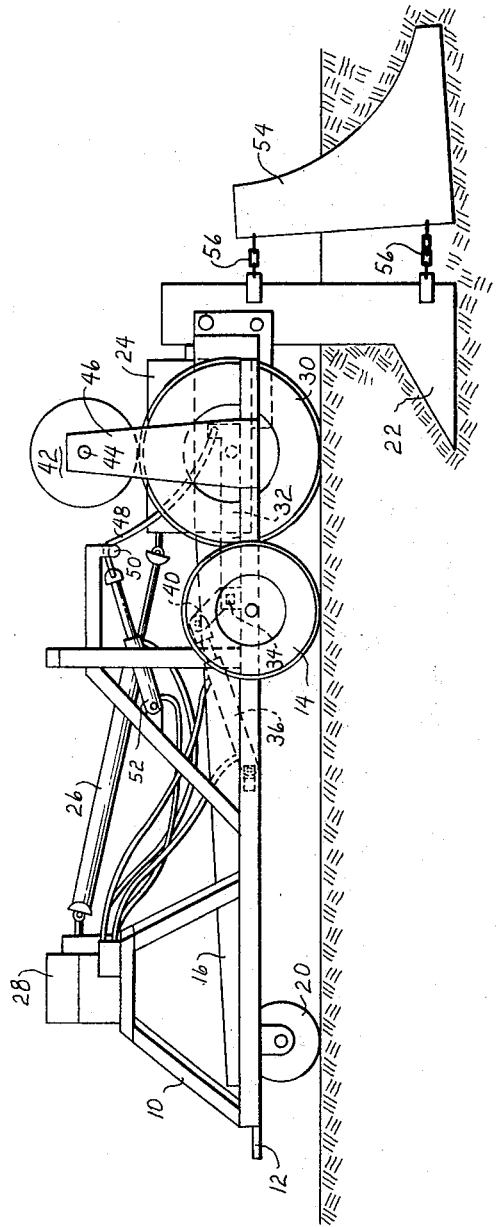
FIG. 1 is a side elevational view of a machine according to this invention in the operating position.
Figure 2:
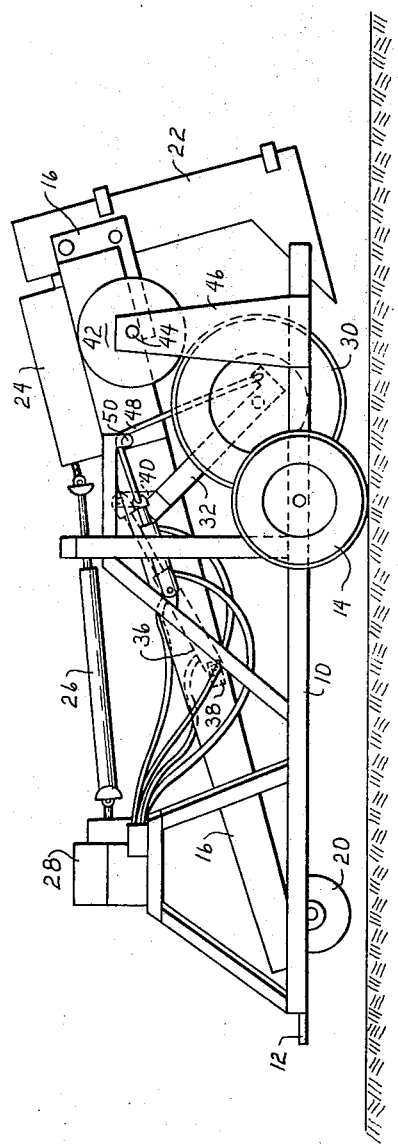
FIG. 2 is a side elevational view similar to FIG. 1 with the plow removed from the soil and the cable chute removed from the plow as would be the condition when being transported.

Outer frame 10 is generally U-shaped. Hitch 12 on the front thereof provides convenient means for attaching the outer frame to a draft vehicle (not shown). Ground engaging wheels 14 support frame 10 above the surface of the earth.

Inner frame 16 is within the outer frame 10. Link 18 at the front of the inner frame 16 attaches it or links it for movement to the front of the outer frame. Rigid wheel 20 at the front of the inner frame 16 engages the ground in operation, thus dampening out any vibrations at this point, thereby isolating vibrations from the outer frame. At least one plow shank 22 is dependingly attached to the rear of the inner frame 16. The plow shank is also called a ripper, a ripper plow, or an earth-working tool.

Box 24 upon the inner frame 16 contains one or more eccentric weights. The weights are rotated by shaft 26 which is powered by engine 28 located on the outer frame. Obviously the rotation of the eccentric weights will vibrate the inner frame 16 and thus the plow shank 22. Thus means for vibrating the inner frame are attached thereto.

Pneumatic tires 30 are mounted upon wheels which are journaled to crank arms 32. The arms are rigidly attached to wheel shaft 34 which is journaled to the inner frame 16. Hydraulic cylinder motors 36 inner connect cross bar 38 of inner frame 16 to ears 40 on the wheel shaft 34. Therefore, expansion or contraction of the hydraulic motors 36 will move the tires 30 up and down. Inasmuch as the tires engage the ground, contraction and expansion of the motors 36 will raise and lower the inner frame 16. Thus, it may be seen that the tires 30 serve a dual function—that of raising and lowering the inner frame and of serving as a resilient element in the vibratory system of the frame 16. As the resilient element, they bounce up and down, storing energy when compressed downward and releasing the energy when expanding upward.

All that has been described above has been disclosed in my prior application cross-referenced above.

Rollers 42 are journaled upon stub axles 44 to plates 46 attached to the outer frame 10. When the wheels are in the position so that the frame 16 is in its lower or plowing position, the rollers 42 are immediately above the pneumatic tires 30 and in engagement therewith. Thus, it may be seen that, if the hard terrain at the bottom of the plow shank 22 tends to raise the plow shank, and thus the inner frame 16 (called riding out), the engagement of the pneumatic tires 30 with the rollers 42 will transfer the weight of the outer frame 10 and the equipment located thereon to the inner frame 16, thus helping to keep the plow shank 22 in the earth.

Obviously, the plow shank 22 is shaped so that it will remain in the earth in normal operation; however, extremely hard terrain, such as soft rock, will almost inevitably cause the shank to ride out.

To raise the plow shank out of the ground to transport the equipment from one location to another, first the hydraulic motors 36 are expanded, thus rotating the crank arms 32 so that the ground engaging tires 30, acting as gauge wheels, are in their lowest position. When the crank arms are rotated so that the tires 30 are down, the tires 30 move forward so that they are no longer under rollers 42. Cable 48 is attached to each crank arm 32 adjacent to the end where the wheel carrying tire 30 is journaled. The cable is reeved through pulley 50 attached to the outer frame 10 and is attached to hydraulic cylinder motor 52. Although the drawing illustrates two crank arms 32, two cables 48, and two hydraulic motors 52, it will be understood that more could be utilized if the weight of the inner frame necessitated additional ones.

To remove the plow shank 22 from the earth, first the hydraulic motors 36 are activated to bring the inner frame 16 as high as possible with the wheels and then the hydraulic motors 52 are activated to raise the frame 16 and the shank 22 even higher.

The hydraulic pumps, valves, etc., have not been illustrated inasmuch as they are well known to the art and commercially available upon the market. It will be noted, however, that, if the cylinders of the motors 36 are sufficiently large in diameter as compared with the cylinders of the motors 52, the motors 36 and 52 could be connected in parallel. Therefore, although hydraulic pressure would be applied to the motors 52 at the same time the pressure was applied to motors 36, the motors 52 would not move until the motors 36 were completely contracted because of the greater force exerted through the motors 36 at the same hydraulic pressure. Obviously, each set of motors 36 and 52 could be operated through separate valves and the sequence of operation controlled manually by the operator.

The outer frame 10 may easily be extended rearwardly and an upward-turned angle iron attached, thus providing a suitable receptacle for a bulldozer blade. Thus, if the terrain requires two tractors to move the plow through the earth, one tractor can pull upon the hitch 12 while a second tractor pushes, the second tractor adding weight to the outer frame 10.

Cable chute 54 is attached to the rear of the plow shank 22. Inasmuch as cable chutes are well known devices in the art and form means for laying a communication cable (such as a long distance telephone cable) in the bottom of the trench formed by the plow shank, they will not be further described here. In order to attach the cable chute to the vibrating plow shank and still isolate the chute from the vibration, the attachment is made with a connection which is free to move in all directions. The specific embodiment of this connection illustrated is that of chain links 56.

The embodiment illustrated is for laying cable; however, there has not been illustrated a cable reel mounted on the outer frame 10 inasmuch as it is well known to the art. Also, obviously, more weight in the form of blocks may be attached to the outer frame 10.

It will be apparent that the embodiment shown is only exemplary and that various modifications can be made in operation, construction, materials, and arrangement within the scope of the invention.

I claim as my invention:
1. In a plow having
   (a) an inside frame,
   (b) at least one plow shank dependingly attached to the inside frame,
   (c) means for vibrating said inside frame, and thus said shank,
   (d) pneumatic ground-engaging tires on said inside frame, and
   (e) an outside frame,
   (f) the inside frame attached for movement to the outside frame at the front of each,
   (g) the improvement comprising in combination with the above,
   (h) rollers attached to the outside frame over the pneumatic tires of the inside frame so that the plow shank on the inside frame cannot ride out of the ground unless it also lifts the outside frame,
   (j) crank arms pivoted to the inside frame,
   (k) said pneumatic tires mounted on said arms,
   (m) means for rotating said crank arms to lower the tires and thus raise the inside frame, the tires moving from under the rollers when lowered.
2. The invention as defined in claim 1 with the additional limitations of:
   (n) cables extending from the crank arms to the outer frame, and
   (o) means on the outside frame for drawing in the cables, thus raising the inside frame.
3. The invention as defined in claim 2 with the additional limitations of:
   (p) a cable chute, and
   (q) a chain-link connection interconnecting the cable chute to the rear of the plow shank,
   (r) said cable chute being means for laying a cable in the bottom of the furrow formed by said plow shank.
4. In a plow having
   (a) an inside frame,
   (b) at least one plow shank dependingly attached to the inside frame,
   (c) means for vibrating the inside frame and thus the shank,
   (d) gauge wheels,
   (e) said gauge wheels on arms mounted on the inside frame for up and down movement to the inside frame,
   (f) an outside frame,
   (g) the inside frame attached for movement to the outside frame at the front of each, and
   (h) cables attached from the outside frame to the gauge wheel arms;

(j) the improvement comprising in combination with the above:
(k) means on the outside frame for drawing in the cable, thus raising the gauge wheels and the inside frame with the plow shank,
(m) rollers on the outside frame over the gauge wheels so that the plow shank cannot ride out of the ground without raising the outside frame.

5. The invention as defined in claim 4 with the additional limitations of
(n) a cable chute, and
(o) a chain-link connection interconnecting the cable chute to the rear of the plow shank,
(p) said cable chute being means for laying a cable in the bottom of the furrow formed by said plow shank.

References Cited

UNITED STATES PATENTS

| | | | |
|---|---|---|---|
| 1,164,309 | 12/1915 | Nilson | 172—679 |
| 3,170,300 | 2/1965 | Kelley | 61—72.6 |
| 3,348,383 | 10/1967 | Kelley | 61—72.6 |
| 3,390,533 | 7/1968 | Gremillion | 61—72.6 |
| 3,396,804 | 8/1968 | Rogers | 172—40 |

RONALD E. PULFREY, Primary Examiner

RONALD C. HARRINGTON, Assistant Examiner

U.S. Cl. X.R.

172—40, 491